United States Patent
Wieczorek et al.

(10) Patent No.: US 6,238,007 B1
(45) Date of Patent: May 29, 2001

(54) RETAINING ARTICLE FOR WHEEL ORNAMENTATION AND METHOD OF MAKING

(75) Inventors: Ted John Wieczorek, Rochester Hills; Robert J. DiMarco, Troy; Ted E. Eikhoff, Grosse Pointe; Eric E. Jensen, Oxford, all of MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/372,947

(22) Filed: Aug. 12, 1999

(51) Int. Cl.⁷ .................................. B60B 7/10; B60B 7/14
(52) U.S. Cl. ..................................... 301/37.31; 301/37.37
(58) Field of Search .................... 301/104.1, 108.3, 301/108.4, 37.1, 37.34, 37.37, 37.31, 37.32, 37.33, 37.35, 37.42, 37.29, 37.38

(56) References Cited

U.S. PATENT DOCUMENTS

| | | | |
|---|---|---|---|
| 4,007,967 | * 2/1977 | Buerger | 301/37.42 |
| 4,123,111 | 10/1978 | Renz et al. | 301/37 TP |
| 4,316,638 | * 2/1982 | Spisak | 301/37.42 |
| 4,382,635 | * 5/1983 | Brown et al. | 301/37.29 |
| 4,410,217 | * 10/1983 | Loren | 301/37.29 |
| 4,460,219 | 7/1984 | Sepanik | 301/108 R |
| 4,470,638 | 9/1984 | Bartyalla | 301/37 CD |
| 4,576,415 | * 3/1986 | Hemepelmann | 301/37.29 |
| 4,699,434 | * 10/1987 | Hempelmann | 301/37.29 |
| 4,723,818 | * 2/1988 | Beisch et al. | 301/37.38 |
| 5,163,739 | 11/1992 | Stanlake | 301/37.37 |
| 5,181,767 | 1/1993 | Hudgins et al. | 301/37.37 |
| 5,249,845 | 10/1993 | Dubost | 301/37.37 |
| 5,286,092 | 2/1994 | Maxwell, Jr. | 301/37.37 |
| 5,297,854 | * 3/1994 | Nielsen et al. | 301/37.37 |
| 5,443,582 | * 8/1995 | Ching | 301/37.37 |
| 5,520,445 | 5/1996 | Toth | 301/37.37 |
| 5,542,750 | 8/1996 | FitzGerald | 301/37.37 |
| 5,667,281 | 9/1997 | Ladouceru | 301/37.37 |
| 5,695,257 | 12/1997 | Wright et al. | 301/37.37 |
| 5,700,062 | * 12/1997 | Wang | 301/37.33 |
| 5,820,225 | 10/1998 | Ferriss et al. | 301/37.1 |
| 5,842,749 | 12/1998 | DiMarco | 301/37.37 |
| 6,039,406 | * 3/2000 | Sheu | 301/108.4 |
| 6,048,036 | * 4/2000 | Alaoui | 301/37.1 |
| 6,070,947 | * 6/2000 | Hoyle, Jr. | 301/108.1 |

FOREIGN PATENT DOCUMENTS

697677 * 1/1931 (FR).

* cited by examiner

Primary Examiner—S. Joseph Morano
Assistant Examiner—Long Bae Nguyen
(74) Attorney, Agent, or Firm—Bliss McGlynn, P.C.

(57) ABSTRACT

A retaining article secures ornamentation, namely wheel caps and wheel covers, to a wheel. The retaining article is a unitary structure. It is received by the ornamentation which has an inboard surface with a number of protrusions extending out therefrom. The protrusions are cylindrical in shape. The retaining article has a ring with a number of openings. The openings receive the protruding cylinders therein and are secured thereto by a number of tabs. The tabs are bent by the protruding cylinders. Legs extend out from the ring. The legs are forced over lug nuts which secure the wheel to a wheel hub. The legs engage a recess in the lug nuts creating a positive engagement with the lug nuts.

10 Claims, 2 Drawing Sheets

RETAINING ARTICLE FOR WHEEL ORNAMENTATION AND METHOD OF MAKING

BACKGROUND OF THE INVENTION

1. Field of the Invention

The invention relates to ornamentation for vehicular wheels. More specifically, the invention relates to a retaining article for wheel caps and covers to secure them to the vehicular wheels.

2. Description of the Related Art

Wheel ornamentation, such as wheel caps and covers (hereinafter "wheel covers") are aesthetic devices used to enhance the look of the wheels to which they are attached. Wheel covers are used because the manufacture, finish and mounting of a wheel cover to a wheel is less expensive than manufacturing a wheel having the same quality finish of a wheel cover. A chrome surface on a wheel cover is an inexpensive alternative to a chrome plated or polished wheel. In addition, wheel covers provide various types of appearances and styling variations, all of which may be combined with a single wheel design. The desirability of wheel covers is, however, directly proportional to the ability to inexpensively attach the wheel covers to the wheel permanently while adding little weight to the overall composite wheel.

U.S. Pat. No. 5,297,854, issued to Nielson et al. on Mar. 29, 1994, discloses a wheel cover retention system which incorporates a plurality of retainers secured to the wheel cover when it is mounted to a hollow protrusion extending out from the inboard surface of the wheel cover. The retainers receive lug nuts which hold the wheel in place. This system of wheel cover retention is undesirable because each retainer is an element independent of the other retainers. Inventory costs and assembly costs increase when dealing with so many pieces which fabricate a retention system.

U.S. Pat. No. 5,695,257, issued to Wright et al. on Dec. 9, 1997, discloses a retention system for a wheel cover. This system includes a ring having a number of attachments secured thereto allowing the wheel cover and the wheel to be attached to the ring keeping the wheel cover secured to the wheel. This system relies on bolts, nuts and attachment brackets. This system is undesirable because there are several parts to the system which require alignment and threading and the system is cumbersome to install and remove from the wheel. More specifically, for a user to access the wheel, the user must unbolt the four bolts which are shown holding the wheel cover to the ring and the four nuts shown securing the ring to the wheel. This task is tedious and undesirable.

SUMMARY OF THE INVENTION

A retaining article is used to secure ornamentation, having an inboard surface defining a plurality of protrusions, to a wheel. The wheel is secured to a wheel hub with a plurality of lug nuts. The retaining article includes a ring defining an outer periphery and an inner periphery. A plurality of openings extend through the ring between the outer and inner diameters. The plurality of openings receive each of the plurality of protrusions extending out from the inboard surface of the ornamentation. The ring also includes a plurality of legs which extend out therefrom to engage the lug nuts securing the ornamentation to the wheel.

One advantage associated with the invention is the ability to secure ornamentation to a wheel of a motor vehicle. Another advantage associated with the invention is the ability to secure ornamentation to a wheel using a single element or article. Yet another advantage associated with the invention is the ability to secure the ornamentation to the wheel using a single element thus reducing the assembly time. Still another advantage associated with the invention is the ability to secure ornamentation to a wheel using a single element in a manner such that the orientation of the retaining element is predisposed eliminating any requirements for alignment or orientation.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
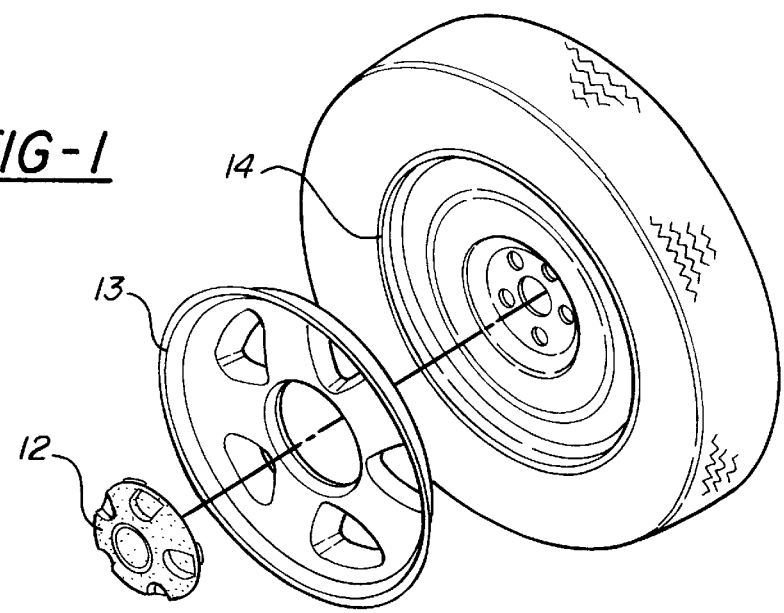
FIG. 1 is a an exploded perspective view of a wheel, wheel cover and a wheel cap.
Figure 3:
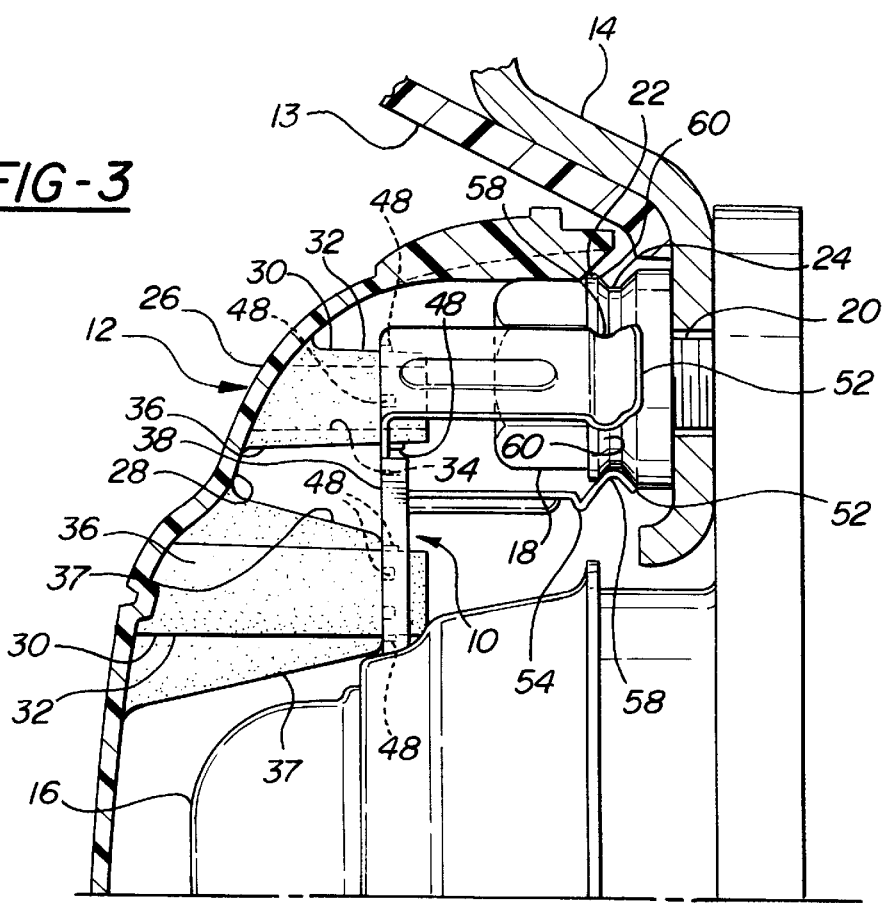
FIG. 3 is a cross-sectional side view partially cut away of one embodiment of the invention securing a wheel cap to a wheel.

Referring to the Figures, a retaining article is generally indicated at 10. The retaining article 10 is a unitary structure that retains ornamentation, generally indicated at 12, to a wheel 14. In the embodiment shown, the ornamentation 12 is a wheel cap. It should be appreciated by those skilled in the art that the retaining article 10 could be adapted to be used with other wheel ornamentation such as a wheel cover 13. The wheel 14 is secured to a wheel hub 16 with lug nuts 18 which threadingly engage lug studs 20. The lug nuts 18 include a ridge 22 and a recess 24.

The wheel cap 12 defines an outboard surface 26 and an inboard surface 28. Holes may extend between the outboard 26 and inboard 28 surfaces depending on the venting and aesthetic requirements. Typically, the outboard surface 26 is finished in a manner suitable for viewing by persons outside the motor vehicle to which the wheel cap 12 is attached. In many instances, it matches the appearance of the wheel cover 13.

Extending out from the inboard surface 28 are a plurality of protrusions 30. In the embodiment shown, the protrusions 30 are cylindrical in shape defining an outer protrusion surface 32 and an inner protrusion surface 34. Depending on the material used to fabricate the wheel cap 12, the thickness of the wall 36 of the protrusions 30 can only be approximately forty to fifty percent of the thickness of the wheel cap 12 between the inboard surface 28 and the outboard surface 26. If the thickness of the wall 36 is greater, it will create recesses in the outboard surface 26 detracting from the aesthetic quality of the outboard surface 26. Stop flanges 37 extend out from the wall 36 and will be discussed in greater detail subsequently.

Figure 2:
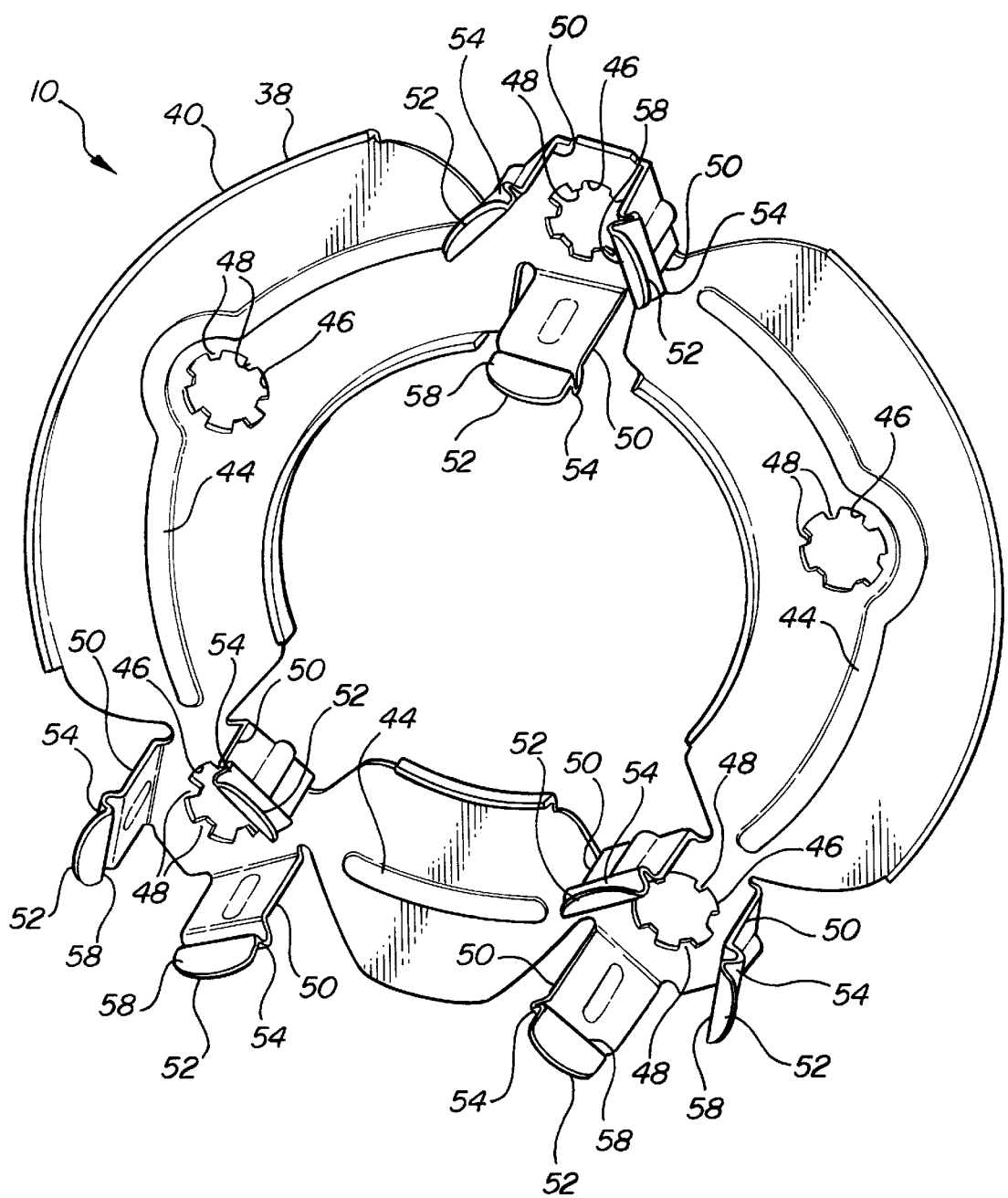
FIG. 2 is a perspective view of one embodiment of the invention.

The retaining article 10 includes a ring 38, best seen in FIG. 2. The ring 38 defines an outer ring periphery 40 and an inner ring periphery 42. The edges of the ring 38 are bent under to increase the strength of the ring 38 while minimizing sharp edges. A ring structural bend 44 extends around much of the ring 38 to aid in the strengthening of the ring 38.

The ring 38 includes a plurality of openings 46. The plurality of openings 46 receive the plurality of protrusions 30 therethrough locking the wheel cap 12 to the retaining article 10. A number of tabs 48 extend into the openings 46. The tabs 48 extend radially inwardly with respect to each of the openings 46. The tabs 48 are spaced along the periphery of the openings 46 and will frictionally engage the outer protrusion diameter 32 of the protrusions 30. The protrusions 30 bend the tabs 48 locking the wheel cap 12 to the retaining article 10. The ring 38 is forced over the protrusions 30 until it abuts the stop flanges 37. This abutment positions the ring 38 with respect to the lug nuts 18 to which the ring 38 will be secured.

Extending downwardly from the ring 38, the retaining article 10 includes a plurality of legs 50. The legs 50 extend out from the ring 38 and engage a portion of the lug nuts 18. Each of the legs 50 is spring biased inwardly to resiliently engage the lug nuts 18 such that the retaining article 10, and hence, the wheel cap 12, are secured to the wheel 14. Each of the legs 50 includes an outwardly extending distal end 52 which aids in the receipt of the lug nuts 18 into the retaining article 10. Each of the legs 50 is in a group of legs associated with a single lug nut 18. In the preferred embodiment, there are three legs 50 for each location that is to be secured to a lug nut 18.

Each of the legs 50 includes a relief 54 which receives the ridge 22 on the lug nut 18. Disposed adjacent the relief 54, each of the legs 50 includes an indentation 58 which engages a chamfered surface 60 on the lug nut 18. It is the contact between the indentation 58 and the chamfered surface 60 that secures the wheel cap 12 to the wheel 14 through the retaining article 10.

The method for securing the wheel cap 12 to the wheel 14 using the retaining article 10 includes the step of stamping a piece of sheet metal to form a ring 38 having a plurality of openings 46. The ring 38 is then cut and portions of the ring 38 are bent downwardly to create the plurality of legs 50 which extend out from the ring 38 in generally parallel direction with respect to the ring 38. Structural bends 44 are pressed into the ring 38 to increase the strength thereof. The legs 50 are bent such that they are able to receive lug nuts 18 therein when the retaining article 10 is secured to the wheel 14. The legs 50 are forced over the lug nuts 18, used to secure the wheel 14 to the wheel hub 16, to secure the retaining article 10 to the wheel 14.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A retaining article for securing ornamentation, having an inboard surface defining a plurality of protrusions, to a wheel secured to a wheel hub with a plurality of lug nuts, said retaining article comprising a ring defining an outer ring periphery, an inner ring periphery, a plurality of openings extending through said ring between said inner and outer ring peripheries for receiving each of the plurality of protrusions of the ornamentation therethrough, and a plurality of legs extending out from said ring at said outer ring periphery thereof engaging a portion of the lug nuts.

2. A retaining article as set forth in claim 1 wherein each of said plurality of openings includes a plurality of tabs to engage each of the protrusions upon passing therethrough to secure said retaining article to the ornamentation.

3. A retaining article as set forth in claim 2 wherein each of said plurality of legs is spring biased inwardly to resiliently engage a lug nut such that said retaining article is secured to the wheel.

4. A retaining article as set forth in claim 3 wherein each of said plurality of legs includes an outwardly extending distal end to receive the lug nut and allow each of said plurality of legs to pass over the lug nut as said retaining article is secured to the wheel.

5. A retaining article as set forth in claim 4 wherein each of said plurality of legs includes a leg structural bend to strengthen each of said plurality of legs.

6. A retaining article as set forth in claim 5 wherein said ring includes a ring structural bend therealong between said inner diameter and said outer diameter.

7. A retaining article as set forth in claim 6 wherein the ornamentation is a wheel cap.

8. A method for securing ornamentation to a wheel using a retaining article, the method comprising the steps of:

stamping a piece of sheet metal to form a ring having a plurality of openings;

cutting the ring;

bending portions of the ring downwardly to create a plurality of legs extending out from the ring generally parallel thereto;

forcing a portion of the ornamentation into each of the plurality of openings securing the ornamentation to the retaining article and the wheel;

bending the plurality of legs to receive the lug nuts when the retaining article is secured to a wheel; and securing the retaining article to the wheel by forcing each of the plurality of legs over lug nuts used to secure the wheel to a wheel hub.

9. A method as set forth in claim 8 including the step of stamping structural bends therein to strengthen the ring.

10. A method as set forth in claim 9 including the step of stamping protrusions into each of the plurality of openings.

* * * * *